3,096,200
METHOD OF PREPARING INORGANIC PRODUCTS
Robert G. Quinn, Bound Brook, N.J., assignor to Johns-Manville Corporation, New York, N.Y., a corporation of New York
No Drawing. Filed Nov. 22, 1960, Ser. No. 70,938
8 Claims. (Cl. 117—54)

This invention relates to a method of enhancing the physical properties of inorganic asbestos products, and more particularly to a treatment which improves the strength and electrical characteristics of compositions comprising asbestos and bentonite and products thereof.

Although having many obviously advantageous properties such as relatively good resistance to many chemicals and high temperature conditions, asbestos, and in turn products composed primarily of asbestos, also exhibits adverse characteristics. Moreover, since asbestos comprises a material which is used extensively in many fields and applications, the prior art contains numerous proposals or means of enhancing the useful characteristics of asbestos and/or of overcoming its disadvantages. For example, a number of United States Letters Patent such as No. 2,718,475, No. 2,661,288, No. 2,394,040, etc., disclose means of improving one or more of the physical attributes of asbestos, but the typical treatments proposed, although undoubtedly furthering the utility of asbestos or the products thereof in one or more specific aspects thereof, fail to effect an overall or general improvement in asbestos compositions or products and more often result in a degrading of the same in some other aspect.

It is a primary object of this invention to enhance the physical properties of inorganic asbestos products such as paper, millboard and the like.

It is a more specific object of this invention to provide an effective and more practical method or means of improving both strength and electrical characteristics of asbestos and bentonite compositions, or products thereof, without imparting thereto any substantially deleterious effect.

These and other objects and advantages of this invention will become apparent from the hereinafter detailed description and examples.

In accordance with the present invention, inorganic asbestos products such as paper, millboard and the like composed predominantly of asbestos fibers but including effective proportions of bentonite clay are decidedly enhanced by a process or sequence of steps comprising first decidedly reducing the amount of the water of hydration of the asbestos constituent followed by a silicon tetrafluoride treatment.

The initial step of the method of this invention is effected by subjecting the asbestos-bentonite material, or product composed of the same, to a sufficiently high temperature to drive off from the asbestos component combined water of hydration, that is, a temperature at least in the vicinity of 1200° F., or about 1200–1500° F. The thermal "dehydration" of the asbestos composition is continued to the point of removing approximately 15–25% by weight of the original combined water content or water of hydration of the asbestos fiber. At temperatures of about 1200° F. removal of aproximately 15% of the original combined water takes about 30 seconds for products such as thin paper which may be readily heated uniformly throughout their mass. Upon removal of the prescribed proportion of the water of hydration, the material or product is permitted to return to normal ambient temperatures.

The process of this invention is then concluded by treating or reacting the thermally dehydrated asbestos-bentonite material, upon cooling, with silicon tetrafluoride. Being a gas at normal temperatures and pressures the silicon tetrafluoride is readily applied and a reaction effected by exposing the asbestos-bentonite material or product to the gas in any convenient or practical manner, such, for example, as within the gas bomb or chamber. Exposure of the dehydrated asbestos-bentonite composition should continue to the point whereby the composition or product has undergone an overall weight increase of at least about 2% up to about 10% and preferably between approximately 3 to 5.5%.

Inorganic materials receptive to the procedure of this invention and, in turn, which are capable of responding to the same to produce the results desired, consist of inorganic products composed essentially of asbestos and bentonite clay with the asbestos constituent in the predominant or major proportion of about 75 to 95% by weight and the balance consisting of bentonite clay, and preferably consisting of about 90% by weight of asbestos with about 10% by weight of clay. Typical asbestos-bentonite products comprise organic-free papers or millboard and related products.

It is to be understood that the following techniques and products thereof are given for the purpose of illustration and are simply exemplary and not to be construed as limiting the novel method and products of this invention.

Samples of 5 mil and 7 mil thick, inorganic papers free of organic constituents and consisting essentially of 90% asbestos fiber and 10% bentonite clay were dried and then heated to and maintained at a temperature of 1200° F. for approximately 30 seconds by passing the sample sheets through the furnace at a speed of 5.3 feet per minute. This resulted in a 1.9% weight loss or an approximate reduction of 15% of the original combined water of hydration of asbestos constituent. The hot sheets were permitted to cool and pick up moisture from ambient room humidity. The thermally dehydrated asbestos-bentonite paper samples were then treated with silicon tetrafluoride ($SiF_4$) gas in a sealed chamber comprising a gas bomb with exposure varying to effect overall weight increases of from about 2 to 8%.

The average physical properties for the thus treated paper samples were as follows:

*Table 1*

| Heat Treatment, °F. | $SiF_4$ Pickup, Percent | Weight (lb./100 sq. ft.) | Thickness (in.) | MD Tensile (lb./in.) | MD Tensile (p.s.i.) |
|---|---|---|---|---|---|
| None | 0 | 2.7 | .0072 | 1.87 | 260 |
| 1,200 | 0 | 2.8 | .0074 | 3.50 | 473 |
| 1,200 | 2.9 | 2.8 | .0073 | 3.85 | 528 |
| 1,200 | 5.6 | 2.9 | .0074 | 4.60 | 622 |
| None | 0 | 1.5 | .0054 | 1.80 | 334 |
| 1,200 | 0 | 1.2 | .0054 | 3.00 | 546 |
| 1,200 | 2.6 | 1.5 | .0052 | 3.40 | 654 |
| 1,200 | 5.4 | 1.5 | .0053 | 3.80 | 717 |

The average di-electric strengths of several 5 mil inorganic paper samples including untreated, heat treated, and those treated in accordance with the invention (that is, a 15% reduction in the water of hydration of the asbestos constitutent coupled with silicon tetrafluoride induced overall weight increase of 2.9%) were determined and were found to be as follows:

Treatment:                        Di-electric strength (volts)
    Asbestos-bentonite paper (5 mils) _____ 2130
    After heat treatment (15% dehydration) ____ 2380
    After silicon tetrafluoride treatment (2.9%
      increase) _____ 2870

Thus the method of this invention decidedly upgrades asbestos-bentonite products in two highly significant respects—strength and electrical properties—without diminishing others.

It will be understood that the details given are for the purpose of illustration, not restriction, and that variations within the spirit of the invention are intended to be included in the scope of the appended claims.

What I claim is:

1. The method of treating inorganic asbestos products consisting essentially of approximately 75 to 95% by weight of asbestos and approximately 25 to 5% by weight of bentonite which comprises removing about 15 to 25% by weight of the water of hydration of the asbestos constituent by heating the product to a temperature of at least about 1200° F. and, upon cooling, subjecting the thus dehydrated asbestos-bentonite product having about 15 to 25% by weight of its water of hydration thermally removed to silicon tetrafluoride gas until an over-all gain in weight of at least about 2% is effected.

2. The method of improving the physical and electrical properties of inorganic asbestos products consisting essentially of a major proportion of approximately 75 to 95% by weight of asbestos and a minor proportion of approximately 25 to 5% by weight of bentonite which comprises removing about 15 to 25% by weight of the water of hydration of the asbestos constituent by heating the product to a temperature of at least about 1200° F. and, upon cooling, subjecting the thus dehydrated asbestos-bentonite product having about 15 to 25% by weight of its water of hydration thermally removed to silicon tetrafluoride gas until an overall gain in weight of approximately 2 to 8% by weight is effected.

3. The method of improving the physical and electrical properties of inorganic asbestos products consisting essentially of approximately 90% by weight of asbestos and approximately 10% by weight of bentonite which comprises removing about 15% by weight of the water of hydration of the asbestos constituent by uniformly heating the product to a temperature of approximately 1200° F. for a period of about 30 seconds and, upon cooling, subjecting the thus dehydrated asbestos-bentonite product having about 15 to 25% by weight of its water of hydration thermally removed to silicon tetrafluoride gas until an overall gain in weight of approximately 2.5 to 5.5% is effected.

4. The method of improving the physical and electrical properties of inorganic asbestos paper products consisting essentially of approximately 90% by weight of asbestos and approximately 10% by weight of bentonite which comprises removing about 15% by weight of the water of hydration of the asbestos constituent by uniformly heating the product to a temperature of approximately 1200° F. for a period of about 30 seconds and, upon cooling, subjecting the thus dehydrated asbestos-bentonite product having about 15 to 25% by weight of its water of hydration thermally removed to silicon tetrafluoride gas until an overall gain in weight of approximately 2.5 to 5.5% is effected.

5. The inorganic asbestos product of the method of claim 1.

6. The inorganic asbestos product of the method of claim 2.

7. The inorganic asbestos product of the method of claim 3.

8. The inorganic asbestos paper of the method of claim 4.

References Cited in the file of this patent
UNITED STATES PATENTS

| | | |
|---|---|---|
| 2,394,040 | Callinan | Feb. 5, 1946 |
| 2,493,604 | Walters | Jan. 3, 1950 |
| 2,616,801 | Badollet et al. | Nov. 4, 1952 |
| 2,657,154 | Brouwer | Oct. 27, 1953 |
| 2,695,549 | Quinn | Nov. 30, 1954 |
| 2,718,475 | Radke et al. | Sept. 20, 1955 |
| 2,954,421 | McCarthy et al. | Sept. 27, 1960 |